Figure 1:
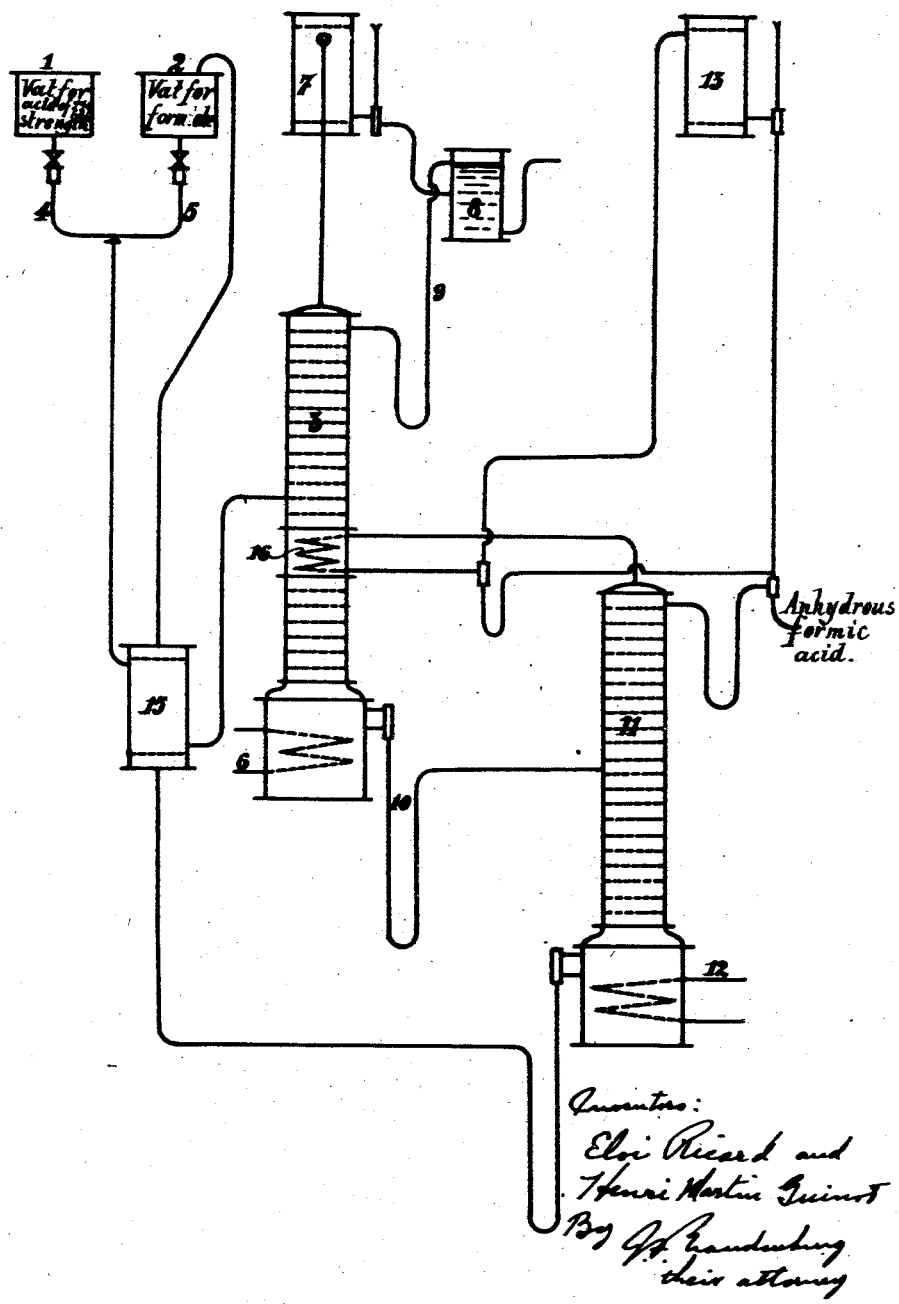

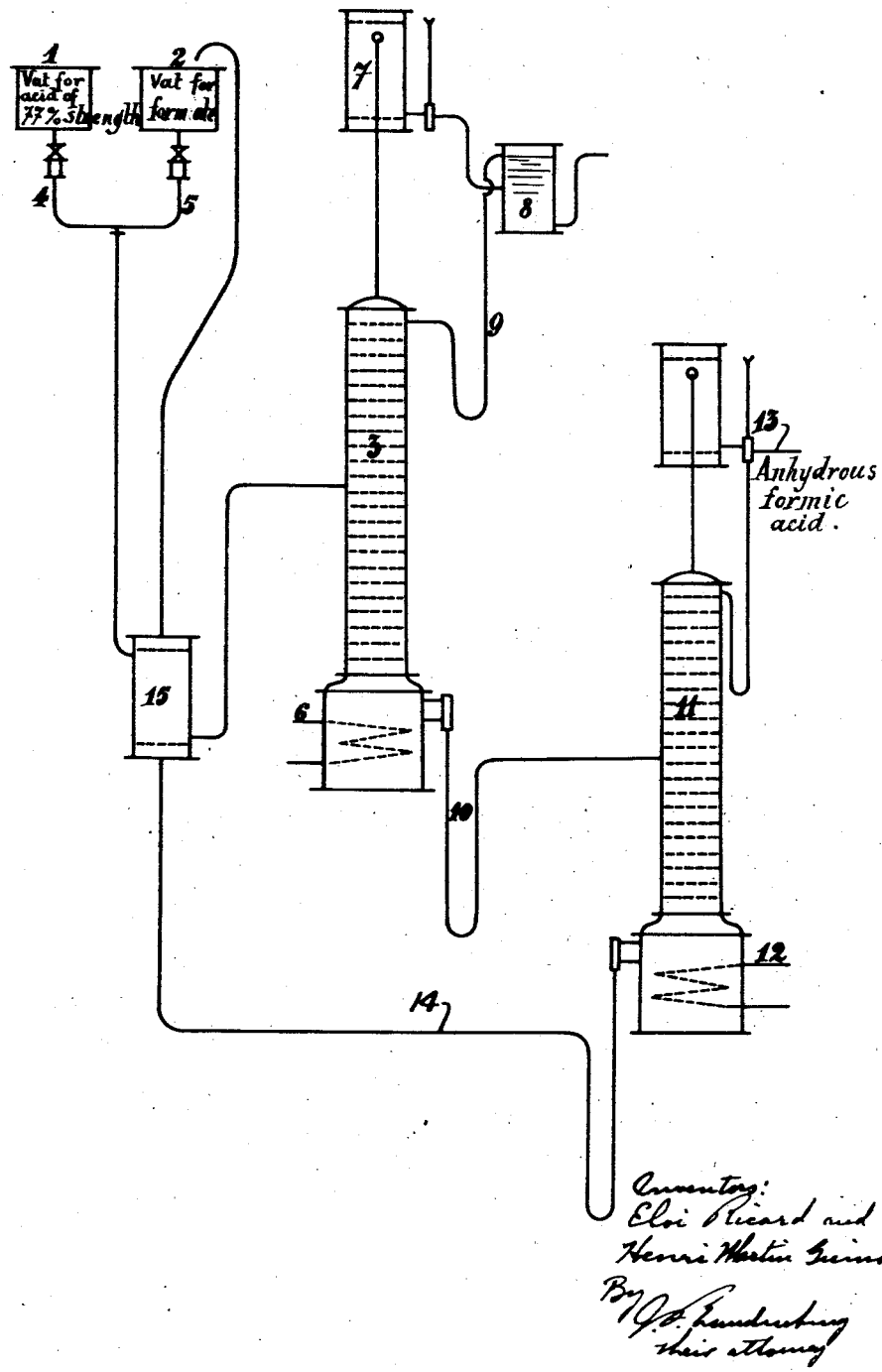

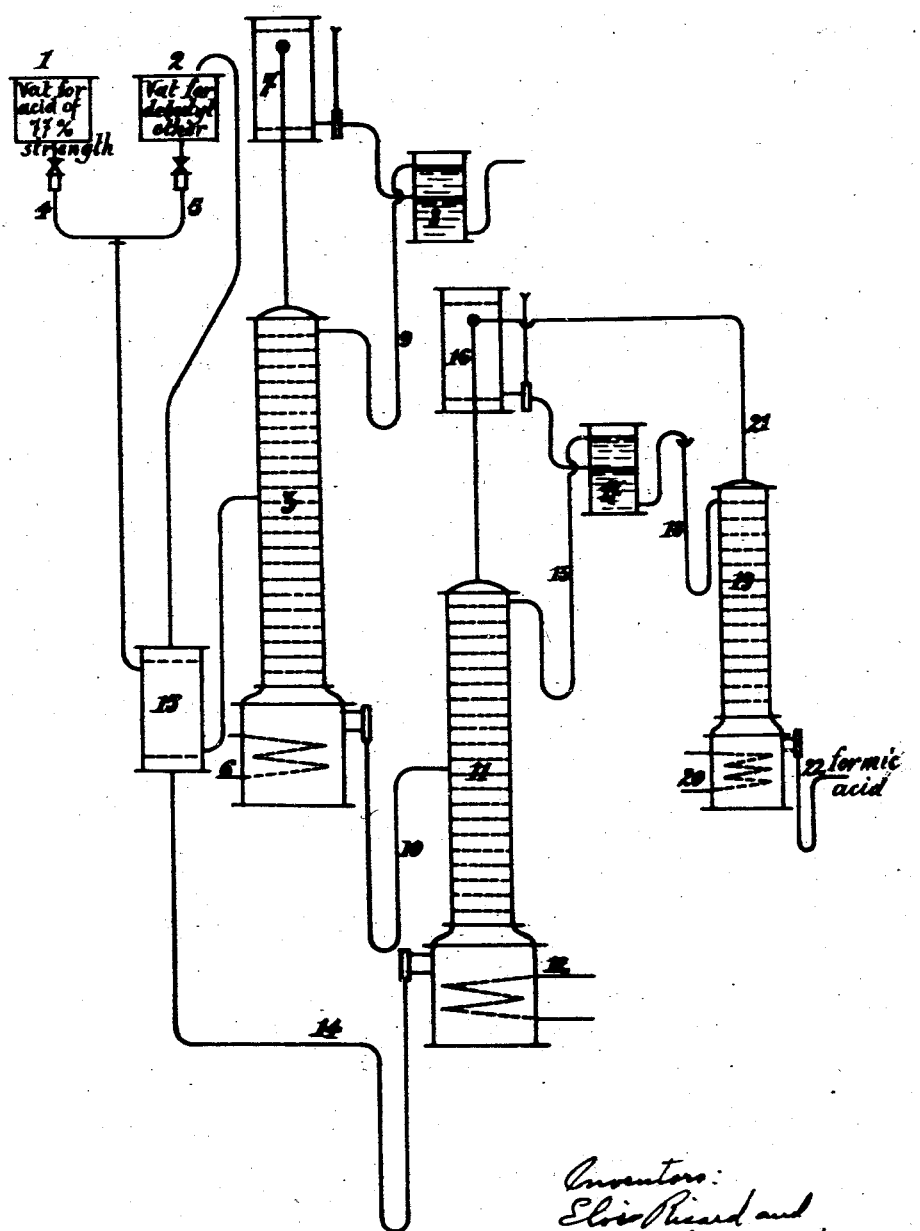

Patented Feb. 7, 1933

1,896,100

UNITED STATES PATENT OFFICE

ELOI RICARD AND HENRI MARTIN GUINOT, OF MELLE, FRANCE, ASSIGNORS TO SOCIETE ANONYME DES DISTILLERIES DES DEUX-SÈVRES, OF MELLE, FRANCE

MANUFACTURE OF ANHYDROUS FORMIC ACID

Application filed December 31, 1928, Serial No. 329,539, and in Belgium January 7, 1928.

It is well known that anhydrous formic acid cannot be obtained by simple distillation of its aqueous solution, a fact which is due to the existence of a mixture of maximum boiling point 107.1° C. consisting of 77 parts of formic acid and 23 parts of water.

Hitherto, the anhydrous acid has been obtained in small quantities by the action of chemical agents of high avidity for water, such as sulphuric acid (Maquenne Bull. de la Soc. Chim. vol. 50, page 662) or phosphoric anhydride (Jones—Soc. of Chem. Ind. 1919, page 362). In both cases it is essential to use a vacuum, which increases the difficulty of the operation and the chances of loss. When sulphuric acid is used the yields are low, for it is necessary to operate at a relatively low temperature to avoid the well known decomposition

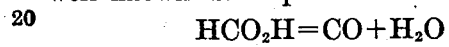
$$HCO_2H = CO + H_2O$$

Also in order to avoid at the end of the reaction a very considerable decomposition it is necessary to leave a considerable proportion of formic acid as a residue in the sulphuric acid used. In these circumstances the yields of concentrated acid does not exceed 60 per cent. The results obtained with $P_2O_5$ are much better, but the reaction is costly, involving difficulty in manipulation and a great consumption of this product.

The methods of concentration by azeotropic distillation applied in the usual manner as described in several prior specifications do not lead to satisfactory industrial results. This is due to the difficulty experienced in exceeding the concentration of the mixture having maximum boiling point. It is known that an aqueous solution of formic acid having more than 77 per cent of acid, furnishes on boiling vapours richer in acid than is the original solution and this strongly retards and even renders impossible the action of the auxiliary liquid which is generally known as the liquid entrainer used in azeotropic dehydrations.

The invention comprises a continuous process for making anhydrous formic acid from aqueous solutions thereof in which the foregoing difficulties are avoided.

In the first place, although this is not indispensable, the solution or mixture of vapours to be treated is brought to the concentration corresponding with the mixture of maximum boiling point. It is known that this concentration is easily attained by ordinary distillation, the water distilling off first, until the mixture has attained the constant boiling point of 107° C.

Whether the preliminary treatment to obtain the maximum boiling point has been used or not, the acid solution under treatment is run into a column still together with a large proportion of an organic liquid capable of resisting the action of boiling formic acid and having a boiling point at least equal to that of formic acid. Examples of such liquids are given hereinafter. They are solvents for formic acid and have a high affinity therefor, and are insoluble in water. The examples are merely for purpose of illustration since liquids having the properties indicated are equivalent.

The part played by this liquid is fundamental; it serves to some degree to dilute the acid so as to permit of the removal of the water by means of an entraining body E as in the ordinary azeotropic method without prohibitive entrainment of acid with the aqueous layer obtained at the head of the column. In the following description this accessory liquid will be called the diluent and will be designated by the letter D.

The liquid entrainer E is by definition a liquid insoluble or little soluble in water. To facilitate the dehydration, it should preferably be selected so that it gives with the water an azeotropic mixture containing as little formic acid as possible.

An important simplification is introduced when the diluent D does not of itself yield a mixture having the minimum boiling point with anhydrous formic acid (for instance formic esters, such as butyl formate or amyl formate). In this case the diluent may advantageously play the part simultaneously of the liquid entrainer E and the diluent D. This simplification is still applicable when the diluent D which is used forms with formic acid a mixture of minimum boiling point containing little acid (for instance di-butyl ether, $C_4H_9O.C_4H_9$).

The essential difference between the process of the invention and the ordinary azeotropic methods is that at the lower part of the dehydrating column there is obtained not a more or less hydrated formic acid but a mixture of anhydrous acid with a large proportion of the diluent D. In both forms of the process, the aqueous formic acid is distilled in the presence of a quantity of water-entraining liquid, which is caused to remain by following a circuit, and the still is fed not only with the aqueous solution of formic acid but also with an organic diluent liquid in such large proportion that the formic acid is restrained from mounting to the top of the still, in result of which the removal of water by the azeotropic method is aided and the mixture of diluent and anhydrous acid is continuously withdrawn from the bottom of the still. In one form of the process the water-entraining liquid and the diluent liquid are different liquids; in the other form they are the same.

Once this mixture is obtained the formic acid is separated from the diluent D either by simple rectification in a second column, if the difference between the boiling points permit this, or on the other hand by distilling the formic acid in the presence of a new accessory liquid A, which yields with formic acid a mixture of minimum boiling point capable, after condensation, of being decanted and gives on the one hand a layer rich in formic acid and on the other hand a layer rich in the accessory liquid A, the latter being returned continually to the cycle. The liquid rich in formic acid yields easily by simple distillation a strictly anhydrous and pure acid.

Numerous liquids may serve as accessory liquid A in the second column. There may be cited, for example without limiting the invention, benzene, toluene, a xylene, certain petroleum hydrocarbons, butyl chloride and chlorinated derivatives of ethylene and of acetylene.

It may be that sometimes impure solutions of formic acid have to be treated, for instance such as contain mineral salts, fragments of cellulose or the like; these impurities are apt to accumulate in the bottom of the column stills and considerably hamper the operation.

To overcome this trouble, such impure solutions may be extracted by a solvent so selected that it can also play the part of the diluent D in the subsequent distillation as described above. For example, a solution of formic acid of 30 per cent. strength containing sodium sulphate may be extracted on the counter-current principle by means of butyl formate which will afterwards act as the diluent D and eventually act as the water entrainer E in the first column still.

It is within the invention to operate under a pressure different from that of the atmosphere.

The following examples illustrate the mechanism of the invention, reference being made to the accompanying diagrams which represent in Figures 1, 2 and 3 respectively 3 varieties of operation.

*Example 1.*—For treating a solution of formic acid of 77 per cent. strength isobutyl formate is used in the dehydrating column as the water entrainer E and in the same column normal amyl formate as the diluent D. In this case the isobutyl formate will be introduced in one quantity into the column 3 (Figure 1) while the normal amyl formate is introduced continuously and together with the acid to be treated. For example, column 3 may be fed with equal volumes of the formic acid and of normal amyl formate by means of pipes 4 and 5.

At the top of column 3 there is obtained a mixture of minimum boiling point, namely water and isobutyl formate boiling at 80.4° C. which separates into two layers; the aqueous layer (about 8%) is rejected while the other is returned to the top of the column.

The mixture of formic acid and normal amyl formate is separated in column 11, with the advantage that the boiling point of formic acid (100.8° C.) is sufficiently high to allow of the recovery of the greater part of the heat contained in the acid vapour issuing from the column 11 by using it in the evaporating coil 16 in column 3 for the purpose of dehydrating the vapours therein. The economy thus realized is important.

*Example 2.*—An aqueous solution of formic acid of 30 per cent strength is preferably concentrated to 77% by ordinary distillation in any type of column still. The concentrated acid stored in vat 1 (Fig. 2) is introduced into the middle part of the distilling column 3 through pipe 4 together with twice its volume of isoamyl formate which is caused to flow from vat 2 through pipe 5. The isoamyl formate will play the double part of water entrainer E and diluent D.

The column 3 is heated at its lower end by means of heating pipes 6 which cause the liquids which flow into the column to boil and a mixture of water and amyl formate having the minimum boiling point 90.2 and containing about 21 per cent. of water is produced at the upper part of the column. This mixture having been condensed in a condenser 7 flows into the separating vessel 8 where it separates into two layers. The aqueous layer is rejected while the upper layer is continually returned to the top of the column 3 through the pipe 9.

From the lower part of column 3 flows a mixture of anhydrous formic acid and amyl formate which passes by pipe 10 into the ordinary rectifying column 11 heated by pipes 12. In this column the anhydrous formic acid, boiling at 100.8° C. is separated from the isoamyl formate which boils at 123° C. The formic acid issues through the pipe 13 and the amyl formate through the pipe 14, the latter being passed through a heat exchanger 15 before it is returned to vat 2.

*Example 3.*—A solution of formic acid of 77 per cent. strength may also be treated as follows:

Into the apparatus (Figure 3) there is charged in a continuous manner equal volumes of di-butyl ether serving as diluent D and formic acid of 77 per cent. strength. The column 3 is in the first instance charged with benzene which is used as liquid water entrainer E. At the top of this column there is obtained the binary mixture of water and benzene of minimum boiling point 69.25 and containing 8.83 per cent. of water. After condensation and separation into layers the upper layer is returned to the top of the column and the lower layer is rejected, or if feasible, distilled to extract the small quantity of formic acid which it may contain and which may be returned to the process. From the lower part of the column 3 flows a mixture of anhydrous acid and di-butyl ether which passes through pipe 10 into the column 11. This column has been preliminarily charged in one operation with a suitable quantity of toluene as auxiliary liquid A which forms with formic acid an azeotropic mixture boiling at 85.8° C. and containing 50 per cent. acid. This mixture, after condensation, passes through pipe 16, into a separating vessel 17. The upper layer formed in this vessel, containing 95 per cent of toluene, is returned to the column 11 through pipe 13; the lower layer containing 93 per cent of acid is conducted by pipe 18 into a small column still 19 heated by coil 20, from this still the small quantity of toluene contained in the said lower layer passes in the form of an azeotropic mixture through pipe 21, while formic acid flows from the bottom of the column through pipe 22 in a continuous manner.

The di-butyl ether used as diluent D descends to the bottom of column 11 and is withdrawn through pipe 14, being returned in a continuous manner to the cycle as described in the preceding example.

The foregoing examples are not intended to limit the invention, either in respect of the apparatus or in respect of the several auxiliary liquids used, but are given merely by way of illustrating the principles involved.

What we claim is:

1. A process for continuously dehydrating aqueous formic acid by distillation of the aqueous acid in the presence of an organic water-entraining liquid, which is caused to remain in the still by following a circuit, in which process the still is continuously supplied not only with formic acid to be dehydrated but also with so large a proportion of organic diluent liquid, which has a boiling point greater than that of the acid, is a solvent for formic acid and has a high affinity therefor, is capable of resisting boiling formic acid and is substantially insoluble in water, that the tendency of the formic acid to distill off with the water-entraining mixture is checked and from the bottom of the still is withdrawn a mixture of anhydrous formic acid and diluent liquid, to be separated by further treatment.

2. A process in accordance with claim 1, in which the organic diluent liquid and the organic entraining liquid are the same.

3. A process in accordance with claim 1, in which the organic diluent liquid and the organic entraining liquid are of different composition.

4. A process as set forth in claim 1, further characterized in that the composition of the aqueous formic acid which is fed into the distillation column is substantially that of the mixture of maximum boiling point which water forms with formic acid.

5. In a process for continuously dehydrating aqueous formic acid by distillation of the aqueous acid with an organic entraining body capable of forming with the water an azeotropic mixture of minimum boiling point, the step which consists in effecting such distillation in presence of an organic diluent liquid not attacked by boiling formic acid and having a boiling point which is greater than that of the acid, to prevent the formic acid from distilling together with the azeotropic mixture formed by the entraining body and the water.

6. In a process of continuously dehydrating aqueous formic acid by distilling the aqueous acid with an organic liquid capable of forming with water a mixture of minimum boiling point, the steps which consist in effecting such distillation in presence of an organic diluent liquid which has a boiling point greater than that of the acid, is a solvent for formic acid and has a high affinity therefor, is capable of resisting boiling formic acid and is insoluble in water, the said diluent liquid being adapted to prevent the formic acid from mounting to the head of the distillation column and withdrawing from the base of the distillation column a mixture of dehydrated formic acid and the said diluent liquid.

7. In a process of continuously dehydrating aqueous formic acid by distilling the aqueous acid with an organic liquid capable of forming with water a mixture of minimum boiling point, the steps which consist in effecting such distillation in presence of an organic diluent liquid not attacked by boiling formic acid and of boiling point greater than that of the acid, the said diluent liquid being adapted to prevent the formic acid from mounting to the head of the distillation column and withdrawing from the base of the distillation column a mixture of dehydrated formic acid and the said diluent liquid.

8. A continuous process which comprises distilling aqueous formic acid with an organic entraining liquid for the water, and in the presence of an organic diluent liquid which has a boiling point greater than that of the acid, is a solvent for formic acid and has a high affinity therefor, is capable of resisting boiling formic acid and is insoluble in water, the said diluent liquid being adapted to prevent formic acid from mounting to the head of the distillation column so that there is recovered from the base of the column a mixture of the said liquid and dehydrated formic acid, and separating the formic acid from said diluent liquid by distillation.

9. A continuous process which comprises distilling aqueous formic acid with an organic entraining liquid for the water, and in the presence of an organic diluent liquid which has a boiling point greater than that of the acid, is a solvent for formic acid and has a high affinity therefor, is capable of resisting boiling formic acid and is insoluble in water, the said diluent liquid being adapted to prevent formic acid from mounting to the head of the distillation column so that there is recovered from the base of the column a mixture of the said liquid and dehydrated formic acid, and separating the formic acid from said diluent liquid by distillation in the presence of a third liquid capable of forming with formic acid a binary azeotropic mixture.

10. A continuous process which comprises distilling aqueous formic acid with an organic entraining liquid for the water, and in the presence of an organic diluent liquid which has a boiling point greater than that of the acid, is a solvent for formic acid and has a high affinity therefor, is capable of resisting boiling formic acid and is insoluble in water, the said diluent liquid being adapted to prevent formic acid from mounting to the head of the distillation column so that there is recovered from the base of the column a mixture of the said liquid and dehydrated formic acid, separating the formic acid from said diluent liquid by distillation, and recycling the diluent liquid.

11. A continuous process which comprises distilling aqueous formic acid with an organic liquid capable of forming with water an azeotropic mixture, said distilling being effected in the presence of an organic diluent liquid adapted to prevent formic acid from mounting to the head of the column, said diluent liquid being an organic liquid which has a boiling point greater than that of the acid, is a solvent for formic acid and has a high affinity therefor, is capable of resisting boiling formic acid and is insoluble in water, recovering from the base of the distillation column a mixture of dehydrated formic acid and the diluent liquid, separating by distillation the diluent liquid and the dehydrated formic acid, returning the diluent liquid to the cycle of manufacture, and heating by means of the diluent liquid, as it returns into the cycle of manufacture, the acid and the diluent liquid which are fed to the primary distillation column.

12. A continuous process which comprises feeding into a distillation column a mixture of aqueous formic acid and an organic diluent liquid not attacked by boiling formic acid and having a boiling point greater than that of the acid, distilling this mixture in the distillation column in presence of a third organic liquid which is an entrainer for the water and adapted to form with water an azeotropic mixture, condensing the vapours which leave the column, separating by decantation the condensed liquid which separates into two layers, rejecting the layer which contains the greater part of the water, returning to the distillation column the layer which contains the entraining liquid, withdrawing from the base of the distillation column a mixture of dehydrated formic acid and diluent liquid, separating by distillation in a second column the formic acid and the diluent liquid and returning the diluent liquid into the cycle of manufacture.

13. A continuous process which comprises feeding into a distillation column a mixture of aqueous formic acid and an organic diluent liquid not attacked by boiling formic acid and having a boiling point greater than that of the acid, distilling this mixture in the distillation column in presence of a third organic liquid which is an entrainer for the water, condensing the vapours which leave the column, separating by decantation the condensed liquid which separates into two layers, rejecting the layer which contains the greater part of the water, returning to the distillation column the layer which contains the entraining liquid, withdrawing from the base of the distillation column a mixture of dehydrated formic acid and diluent liquid, separating by distillation in a second column the formic acid and the diluent liquid and recycling the diluent liquid, heating by means of the diluent liquid as it returns to its cycle the mixture of formic acid and diluent liquid fed into the primary distillation column and using the vapour of dehydrated formic acid leaving the second distillation column to heat the primary distillation column.

14. A process of continuous dehydration of aqueous formic acid consisting in feeding into a distillation column a mixture of aqueous formic acid and an organic diluent liquid not attacked by boiling formic acid and having a boiling point greater than that of the acid, distilling this mixture in the distillation column in presence of a third organic liquid which is an entrainer for the water adapted to form with water an azeotropic mixture, condensing the vapours which leave the column, separating by decantation the condensed liquid which separates into two layers, rejecting the layer which contains the greater part of the water, returning to the distillation column the layer which contains the entraining liquid, withdrawing from the base of the distillation column a mixture of dehydrated formic acid and diluent liquid, separating the dehydrated formic acid and the diluent liquid by distillation in a second column in the presence of another entraining liquid adapted to form with the formic acid a binary mixture of minimum boiling point, recovering the diluent liquid at the base of the second column and recycling, condensing the vapours of the binary mixture of minimum boiling point which leave the head of the second column, separating the two layers into which the condensed liquid settles, returning to the distillation column the layer which contains the greater part of the entraining liquid and distilling the other layer to separate from it the entraining liquid on the one hand and the dehydrated formic acid on the other.

15. A process of continuous dehydration of aqueous and impure formic acid consisting in extracting the acid from its aqueous and impure solution by means of an organic solvent adapted to act as a diluent liquid to make a mixture of solvent and formic acid, said solvent being substantially insoluble in water and having a boiling point greater than that of the acid, distilling this mixture in a distillation column in presence of a third organic liquid adapted to form with water a binary mixture of minimum boiling point, recovering at the base of the distillation column the mixture of solvent and dehydrated formic acid and separating by distillation the solvent and dehydrated formic acid, the solvent being continuously recycled.

In testimony whereof we have signed this specification.

ELOI RICARD.
HENRI MARTIN GUINOT.